Figure 1:
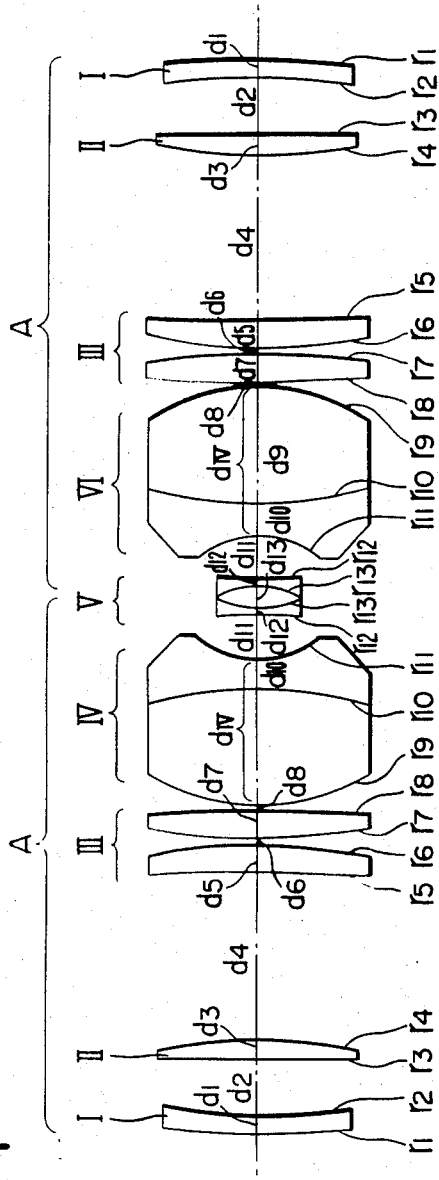

United States Patent
Kano

[11] 3,797,916
[45] Mar. 19, 1974

[54] HIGH RESOLVING-POWER DUPLICATING LENS OF UNIT MAGNIFICATION

[75] Inventor: Ichiro Kano, Yokohama, Japan

[73] Assignee: Canon Kabushiki Kaisha, Tokyo, Japan

[22] Filed: Jan. 13, 1972

[21] Appl. No.: 217,598

[30] Foreign Application Priority Data
Jan. 20, 1971  Japan .......................... 46-1229

[52] U.S. Cl. .............................................. 350/214
[51] Int. Cl. ............................................ G02b 9/64
[58] Field of Search ................................... 350/214

[56] References Cited
UNITED STATES PATENTS

| | | | |
|---|---|---|---|
| 2,481,639 | 9/1949 | Altman et al. | 350/214 X |
| 3,133,983 | 5/1964 | Rickless et al. | 350/216 X |
| 2,836,100 | 5/1958 | Richter et al. | 350/214 X |
| 3,540,800 | 11/1970 | Tibbetts et al. | 350/214 |

Primary Examiner—John K. Corbin
Attorney, Agent, or Firm—Toren & McGeady

[57] ABSTRACT

A high resolving-power duplicating lens of unit magnification having the lens arrangement of longitudinal symmetry in which at the opposite ends of the center, negative meniscus lenses (I)(I) with the concave surfaces facing to the center, next to them positive lenses (II)(II) with the convex surfaces facing to the center, next to them lens groups (III)(III) consisting of two or more positive lenses, next to them negative meniscus lenses (IV)(IV) of doublets of which the concave surfaces nearest to the center are faced to the center, and a central double-concave lens (V) of singlet or multiplet symmetrical as a whole are so arranged as to satisfy the following conditions:

(1) $0.4 f_A < d_{IV} < 1.5 f_A$
(2) $0.2 f_A < d_4 < 1.0 f_A$
(3) $0 < -f_A/f_V < 0.8$
(4) $0.01 < n_{IV_1} - n_{IV_2} < 0.2$ where $f_A$ : focal length of each of the two blocks (A)(A) in air, into which the lens system is divided at the center $d_{IV}$ : axial thickness of lens (IV)

$d_4$ : distance between lens (II) and lens group (III)

$f_V$ : focal length of lens (V)

$n_{IV_1}$ : refractive index of the outside lens of lens (IV)

$n_{IV_2}$ : refractive index of the inside lens of lens (IV)

1 Claim, 6 Drawing Figures

HIGH RESOLVING-POWER DUPLICATING LENS OF UNIT MAGNIFICATION

The present invention relates to a lens suitable for use in a case of ultrahigh resolving-power being necessary for the duplication of unit magnification such as to produce integrated circuits by printing photomasks on wafers. The lens of this kind is required to have high resolving-power over an entire image field so that spherical aberration, coma aberration, astigmatism, curvature of image field, distortion, and off-axis halo are necessary to be reduced to a high degree. It is known that the symmetrical arrangement of lenses is automatically free from coma and distortion. The present invention, employing the symmetrical arrangement of lenses, makes use of the above-mentioned feature to advantage so that the aberrations which have to be reduced are spherical aberration, astigmatism, curvature of image field and off-axis halo. In this case, it is the most difficult to reduce the field curvature and off-axis halo simultaneously to a high degree. In general, as the field curvature is made smaller, the off-axis halo tends to be reduced excessively; as the off-axis halo is made smaller, the field curvature tends to be reduced insufficiently. In addition, the tendency is particularly remarkable in the symmetrical arrangement of lenses. The present invention is to overcome this difficulty, and makes it possible to correct for both the field curvature and off-axis halo to a high degree by employing an arrangement which will be mentioned below.

The present inventive lens arrangement is of longitudinal symmetry, in which at the opposite ends of the center, negative meniscus lenses I, I with the concave surfaces facing to the center, next to them positive lenses II, II with the convex surfaces facing to the center, next to them lens groups III, III consisting of two or more positive lenses, next to them negative meniscus lenses IV, IV of doublets of which the surfaces nearest to the center are concave surfaces facing to the center, and a central double-concave lens (V) of singlet or multiplet symmetrical as a whole are so arranged as to satisfy the following conditions.

1. $0.4 f_A < d_{IV} < 1.5 f_A$
2. $0.2 f_A < d_4 < 1.0 f_A$
3. $0 < -(f_A/f_V) < 0.8$
4. $0.01 < n_{IV_1} - n_{IV_2} < 0.2$ where $f_A$ : focal length of each of the two blocks A, A in air, into which the lens system is divided at the center $d_{IV}$ : axial thickness of lens IV $d_4$ : distance between lens II and lens group III $f_V$ : focal length of lens V $n_{IV_1}$: refractive index of the outside lens of lens IV $n_{IV_2}$: refractive index of the inside lens of lens IV The present invention will be described in reference to the attached drawings.

Figure 2:
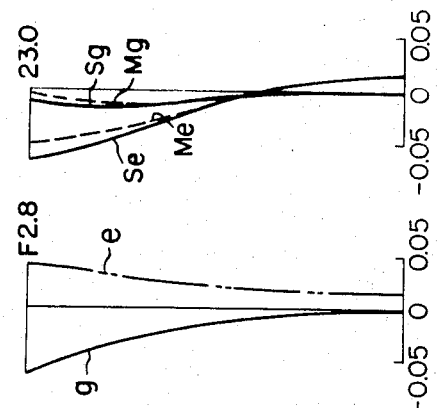
Figure 3:
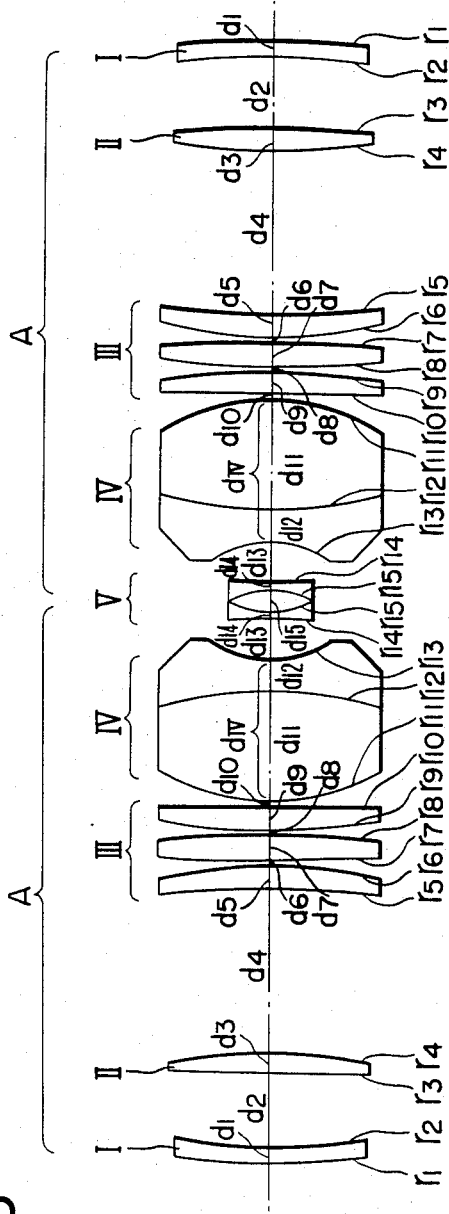
Figure 4:
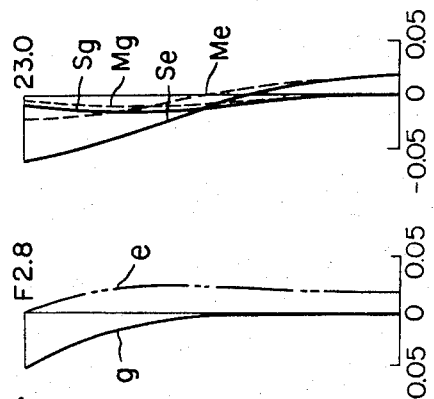
Figure 5:
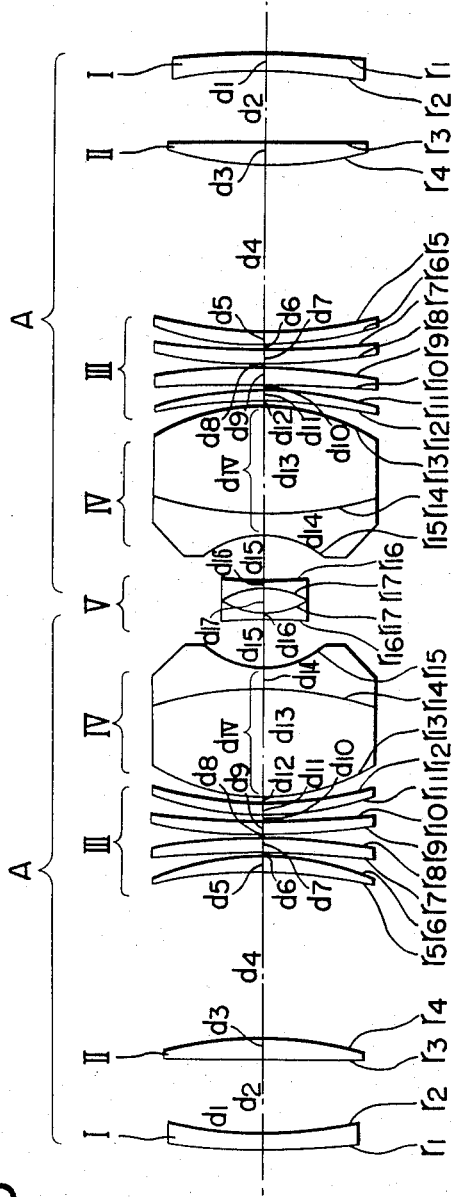
Figure 6:
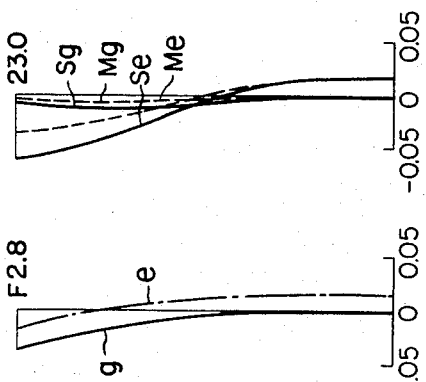

FIG. 1 is a block diagram of Example 1 of the present inventive lens, and FIG. 2 is a graph of aberration in case of the just-mentioned example. FIG. 3 is a block diagram of Example 2 and FIG. 4 is a graph of aberration in case of the just-mentioned example. FIG. 5 is a block diagram of Example 3 and FIG. 6 is a graph of aberration in case of the just-mentioned example.

The present inventive lens belongs to a deformation of so-called Gauss-type lens. In the Gauss-type lens, in order to make field curvature smaller, it is a good way to increase the thickness of a concave meniscus lens, but this procedure results in an over-correction for off-axis halo. In the present inventive lens, concave meniscus lenses I, I correcting for field curvature without giving any influence to spherical aberration are placed at the ends of the lens system, and therewithal the field curvature is reduced to a high degree by increasing the thickness $d_{IV}$ of concave meniscus lens (IV)(IV) consisting of two cemented lenses to such an extent as defined in condition 1. Where $d_{IV}$ is beyond this least upper bound, the tendency of over-correction for off-axis halo becomes stronger, accompanied with the insufficient correction for spherical aberration. Where $d_{IV}$ is below this greatest lower bound, the effect on the correction for field curvature cannot be expected.

Next, condition 2. is so defined as to compensate particularly the meridional halo out of the over-corrected off-axis halo occurring under conditions 1. Namely, as $d_4$ increases, on-axis ray passes through lens II at lower position, so that the refracting action of the convex lens does not work sufficiently. Therefore, in order to keep the focal length of lens block A constant, the refracting power of lens II should be strengthened. On the other hand, off-axis principal ray passes through lens II at higher position with the increase of $d_4$ so that the refracting power of the convex lens affects it strongly, and, in addition, lens II itself becomes stronger in refracting power as mentioned before, thus the refracting action of the convex lens becoming larger. Therefore, this action compensates the off-axis meridional halo from its over-correction in the direction to insufficient correction. However, as $d_4$ is increased too much, the refracting power of lens II becomes stronger than enough, so that the tendency of insufficient reduction for field curvature is strengthened and the over-correction of off-axis sagittal halo becomes larger in contrast with the off-axis meridional halo. The least upper bound defines this limit, while below the greatest lower bound this correction effect cannot be obtained.

Next, condition 3. is so defined as to reduce the off-axis sagittal halo. If lens V is allowed to take over a portion of the negative refracting power of lens I by strengthening adequately the negative refracting power of lens V, the negative refracting power of lens I weakens. In this case, the over-correction for off-axis sagittal halo occurring at lens I diminishes. If the negative refracting power of lens V is strengthened too much, the negative refracting power of lens I becomes so weak as to weaken the effect on correction for field curvature which is the original object of that lens. The least upper bound of condition (3) defines the limit for obtaining the above-mentioned effect, while below the greatest lower bound the effect cannot be obtained.

Next, condition 4. is so defined as to correct for the spherical aberration. The spherical aberration is reduced to a high degree by composing the lens group III with two or more convex lenses and therewith setting $n_{IV_1} - n_{IV_2} < 0.01$ for lens IV. The increase in number of lenses in lens group III as such has an effect on the reduction of spherical aberration, and, moreover, on setting $n_{IV_1} - n_{IV_2} > 0.01$, the negative refracting power at the cemented surface of lens V is strengthened to decrease the quantity of insufficient correction for the spherical aberration. If $n_{IV_1} - n_{IV_2}$ is increased too much, the excessive increase of the negative refracting power at the cemented surface strengthens more strongly the tendency of over-correction for the off-axis halo so that $n_{IV_1} - n_{IV_2} < 0.2$ is set so as to prevent this tendency.

In the following, numerical examples embodying the present invention will be given.

$r$ : Radius of curvature on each of the refractive surface, successively $d$ : Axial thickness of each of the lenses, or distance between them in air, successively $n$ : Refractive index of each of the lenses with respect to g-ray, successively $v$ : Abbe number of each of the lenses, successively

EXAMPLE 1

$f_1=100$    Total system: $f=789.19$    F number: 2.8

I
$\begin{bmatrix} r_1=1449.465 \\ \quad d_1=5.952 \quad n_1=1.62382 \quad v_1=38.01 \\ r_2=256.601 \end{bmatrix}$
$\quad d_2=25.470$ II
$\begin{bmatrix} r_3=3191.282 \\ \quad d_3=9.524 \quad n_2=1.71062 \quad v_2=50.81 \\ r_4=-202.039 \end{bmatrix}$
$\quad d_4=70.868$ III
$\begin{bmatrix} r_5=-2017.145 \\ \quad d_5=14.286 \quad n_3=1.71062 \quad v_3=50.81 \\ r_6=-213.151 \\ \quad d_6=0.298 \\ r_7=-298.317 \\ \quad d_7=14.286 \quad n_4=1.71062 \quad v_4=50.81 \\ r_8=-805.381 \end{bmatrix}$
$\quad d_8=0.298$ IV
$\begin{bmatrix} r_9=92.029 \\ \quad d_9=50.792 \quad n_5=1.71062 \quad v_5=50.81 \\ r_{10}=-248.190 \\ \quad d_{10}=15.134 \quad n_6=1.62382 \quad v_6=38.01 \\ r_{11}=44.217 \end{bmatrix}$
$\quad d_{11}=18.028$ V
$\begin{bmatrix} r_{12}=-854.007 \\ \quad d_{12}=2.976 \quad n_7=1.67252 \quad v_7=33.80 \\ r_{13}=39.636 \\ \quad d_{13}=10.548 \quad n_8=1.67255 \quad v_8=57.33 \\ r_{13}=-39.636 \\ \quad d_{12}=2.976 \quad n_7=1.67252 \quad v_7=33.80 \\ r_{12}=854.007 \end{bmatrix}$
$\quad d_{11}=18.028$ IV
$\begin{bmatrix} r_{11}=-44.217 \\ \quad d_{10}=15.134 \quad n_6=1.62382 \quad v_6=38.01 \\ r_{10}=248.190 \\ \quad d_9=50.792 \quad n_5=1.71062 \quad v_5=50.81 \\ r_9=-92.029 \end{bmatrix}$
$\quad d_8=0.298$ III
$\begin{bmatrix} r_8=805.381 \\ \quad d_7=14.286 \quad n_4=1.71062 \quad v_4=50.81 \\ r_7=-298.317 \\ \quad d_6=0.298 \\ r_6=213.151 \\ \quad d_5=14.286 \quad n_3=1.71062 \quad v_3=50.81 \\ r_5=2017.145 \end{bmatrix}$
$\quad d_4=70.868$ II
$\begin{bmatrix} r_4=202.039 \\ \quad d_3=9.524 \quad n_2=1.71062 \quad v_2=50.81 \\ r_3=-3191.282 \end{bmatrix}$
$\quad d_2=25.470$ I
$\begin{bmatrix} r_2=-256.601 \\ \quad d_1=5.952 \quad n_1=1.62382 \quad v_1=38.01 \\ r_1=-1449.465 \end{bmatrix}$
$f_r=-632.47$

EXAMPLE 2

$f_1=100$    Total system: $f=2358.13$    F number: 2.8

I
$\begin{bmatrix} r_1=571.654 \\ \quad d_1=5.952 \quad n_1=1.62382 \quad v_1=38.01 \\ r_2=261.027 \end{bmatrix}$
$\quad d_2=32.165$ II
$\begin{bmatrix} r_3=1532.780 \\ \quad d_3=9.524 \quad n_2=1.71062 \quad v_2=50.81 \\ r_4=-220.519 \end{bmatrix}$
$\quad d_4=70.867$ III
$\begin{bmatrix} r_5=-586.239 \\ \quad d_5=11.905 \quad n_3=1.71062 \quad v_3=50.81 \\ r_6=-216.454 \\ \quad d_6=0.298 \\ r_7=-1578.960 \\ \quad d_7=11.905 \quad n_4=1.71062 \quad v_4=50.81 \\ r_8=-510.527 \\ \quad d_8=0.298 \\ r_9=-283.988 \\ \quad d_9=11.905 \quad n_5=1.71062 \quad v_5=50.81 \\ r_{10}=-2570.631 \\ \quad d_{10}=0.298 \\ r_{11}=92.793 \\ \quad d_{11}=49.378 \quad n_6=1.71062 \quad v_6=50.81 \\ r_{12}=-224.645 \\ \quad d_{12}=14.225 \quad n_7=1.62382 \quad v_7=38.01 \\ r_{13}=44.759 \end{bmatrix}$
$\quad d_{13}=17.839$ $\begin{bmatrix} r_{14}=-461.459 \\ \quad d_{14}=2.976 \quad n_8=1.67252 \quad v_8=33.80 \\ r_{15}=40.577 \\ \quad d_{15}=10.548 \quad n_9=1.67255 \quad v_9=57.33 \\ r_{15}=-40.577 \\ \quad d_{14}=2.976 \quad n_8=1.67252 \quad v_8=33.80 \\ r_{14}=461.459 \end{bmatrix}$
$\quad d_{13}=17.839$ $\begin{bmatrix} r_{13}=-44.759 \\ \quad d_{12}=14.225 \quad n_7=1.62382 \quad v_7=38.01 \\ r_{12}=224.645 \\ \quad d_{11}=49.378 \quad n_6=1.71062 \quad v_6=50.81 \\ r_{11}=-92.793 \end{bmatrix}$
$\quad d_{10}=0.298$ $\begin{bmatrix} r_{10}=-2570.631 \\ \quad d_9=11.905 \quad n_5=1.71062 \quad v_5=50.81 \\ r_9=-283.988 \\ \quad d_8=0.298 \\ r_8=510.527 \\ \quad d_7=11.905 \quad n_4=1.71062 \quad v_4=50.81 \\ r_7=-1578.960 \\ \quad d_6=0.298 \\ r_6=216.454 \\ \quad d_5=11.905 \quad n_3=1.71062 \quad v_3=50.81 \\ r_5=586.239 \end{bmatrix}$
$\quad d_4=70.867$ II
$\begin{bmatrix} r_4=220.519 \\ \quad d_3=9.524 \quad n_2=1.71062 \quad v_2=50.81 \\ r_3=-1532.780 \end{bmatrix}$
$\quad d_2=32.165$ I
$\begin{bmatrix} r_2=-261.027 \\ \quad d_1=5.952 \quad n_1=1.62382 \quad v_1=38.01 \\ r_1=-571.654 \end{bmatrix}$
$f_r=-340.63$

EXAMPLE 3:

$f_1=100$    Total system: $f=1710.36$    F number: 2.8

$\begin{bmatrix} r_1=534.812 \\ \quad d_1=5.952 \quad n_1=1.62382 \quad v_1=38.01 \\ r_2=185.870 \end{bmatrix}$
$\quad d_2=32.303$ $\begin{bmatrix} r_3=1624.666 \\ \quad d_3=9.524 \quad n_2=1.71062 \quad v_2=50.81 \\ r_4=-162.647 \end{bmatrix}$
$\quad d_4=72.424$ $\begin{bmatrix} r_5=-202.677 \\ \quad d_5=7.738 \quad n_3=1.71062 \quad v_3=50.81 \\ r_6=-136.733 \\ \quad d_6=0.298 \\ r_7=-431.849 \\ \quad d_7=7.738 \quad n_4=1.71062 \quad v_4=50.81 \\ r_8=-260.194 \\ \quad d_8=0.298 \\ r_9=293.072 \\ \quad d_9=7.738 \quad n_5=1.71062 \quad v_5=50.81 \\ r_{10}=835.329 \\ \quad d_{10}=0.298 \\ r_{11}=153.847 \\ \quad d_{11}=7.738 \quad n_6=1.71062 \quad v_6=50.81 \\ r_{12}=240.353 \end{bmatrix}$
$\quad d_{12}=0.298$ $\begin{bmatrix} r_{13}=96.832 \\ \quad d_{13}=46.980 \quad n_7=1.71062 \quad v_7=50.81 \\ r_{14}=-209.123 \\ \quad d_{14}=11.996 \quad n_8=1.62382 \quad v_8=38.01 \\ r_{15}=46.077 \end{bmatrix}$
$\quad d_{15}=19.671$ $\begin{bmatrix} r_{16}=-412.033 \\ \quad d_{16}=2.976 \quad n_9=1.67252 \quad v_9=33.80 \\ r_{17}=42.574 \\ \quad d_{17}=10.548 \quad n_{10}=1.67255 \quad v_{10}=57.33 \\ r_{17}=-42.574 \\ \quad d_{16}=2.976 \quad n_9=1.67252 \quad v_9=33.80 \\ r_{16}=412.033 \end{bmatrix}$
$\quad d_{15}=19.671$ $\begin{bmatrix} r_{15}=-46.077 \\ \quad d_{14}=11.996 \quad n_8=1.62382 \quad v_8=38.01 \\ r_{14}=209.123 \\ \quad d_{13}=46.980 \quad n_7=1.71062 \quad v_7=50.81 \\ r_{13}=-96.832 \end{bmatrix}$
$\quad d_{12}=0.298$

| | | | |
|---|---|---|---|
| III | $r_{12}=-240.353$ | | |
| | $d_{11}=7.738$ | $n_6=1.71062$ | $v_6=50.81$ |
| | $r_{11}=-153.847$ | | |
| | $d_{10}=0.298$ | | |
| | $r_{10}=-835.329$ | | |
| | $d_9=7.738$ | $n_5=1.71062$ | $v_5=50.81$ |
| | $r_9=-293.072$ | | |
| | $d_8=0.298$ | | |
| | $r_8=260.194$ | | |
| | $d_7=7.738$ | $n_4=1.71062$ | $v_4=50.81$ |
| | $r_7=431.849$ | | |
| | $d_6=0.298$ | | |
| | $r_6=136.733$ | | |
| | $d_5=7.738$ | $n_3=1.71062$ | $v_3=50.81$ |
| | $r_5=202.677$ | | |
| | $d_4=72.424$ | | |
| II | $r_4=162.647$ | | |
| | $d_3=9.524$ | $n_2=1.71062$ | $v_2=50.81$ |
| | $r_3=-1624.666$ | | |
| | $d_2=32.303$ | | |
| I | $r_2=-185.870$ | | |
| | $d_1=5.952$ | $n_1=1.62382$ | $v_1=38.01$ |
| | $r_1=-534.812$ | | |
| | $f_r=-303.89$ | | |

Further, in the examples mentioned above, the double-concave lens V that is placed at the center is formed of three cemented lenses. This is because chromatic aberration with respect to g-ray and e-ray is intended to be reduced to a high degree. However, there are some cases where only g-ray of the reference ray is enough to be taken into account for the purpose of using the lens, and this triplet comprises concave lenses and a convex lens having almost the same refractive indices with respect to g-ray. In such a case, the lens V may be replaced with a double-concave lens of singlet. Further, two lenses having the same refractive indices only for the reference ray and different refractive indices for other rays may be cemented to make a double-concave lens symmetrical as a whole so as to correct for chromatic aberration.

What is claimed:

1. A high resolving-power duplicating lens of unit magnification having the lens arrangement of longitudinal symmetry in which at the opposite ends of the center, negative meniscus lenses (I)(I) with the concave surfaces facing to the center, next to them positive lenses (II)(II) with the convex surfaces facing to the center, next to them lens groups (III)(III) including a plurality of positive lenses, next to them negative meniscus lenses (IV)(IV) of doublets of which the concave surfaces nearest to the center face the center, and a central double-concave lens (V) symmetrical as a whole arranged to satisfy the following conditions:

1. $0.57 f_A < d_{IV} < 0.66 f_A$
2. $0.70 f_A < d_4 < 0.73 f_A$
3. $0.15 < -(f_A/f_V) < 0.33$
4. $n_{IV_1} - n_{IV_2} =$ about .09 where $f_A$ : focal length of each of the two blocks (A)(A) in air, into which the lens system is divided at the center
$d_{IV}$ : axial thickness of lens (IV)
$d_4$ : distance between lens (II) and lens group (III)
$f_V$ : focal length of lens (V)
$n_{IV_1}$: refractive index of the outside lens of lens (IV)
$n_{IV_2}$: refractive index of the inside lens of lens (IV).

* * * * *